(12) United States Patent
Kuehl

(10) Patent No.: US 12,741,240 B2
(45) Date of Patent: Sep. 22, 2026

(54) ROTATING IRRIGATION SCREEN APPARATUS

(71) Applicant: Nathan Mark Kuehl, Rigby, ID (US)

(72) Inventor: Nathan Mark Kuehl, Rigby, ID (US)

( * ) Notice: Subject to any disclaimer, the term of this patent is extended or adjusted under 35 U.S.C. 154(b) by 468 days.

(21) Appl. No.: 18/368,115

(22) Filed: Sep. 14, 2023

(65) Prior Publication Data

US 2024/0416263 A1 Dec. 19, 2024

Related U.S. Application Data

(63) Continuation of application No. 18/209,637, filed on Jun. 14, 2023, now Pat. No. 11,786,848.

(51) Int. Cl.

| | |
|---|---|
| ***B01D 33/073*** | (2006.01) |
| ***B01D 33/48*** | (2006.01) |
| ***B01D 33/80*** | (2006.01) |
| *A01G 25/00* | (2006.01) |

(52) U.S. Cl.

CPC .......... *B01D 33/073* (2013.01); *B01D 33/48* (2013.01); *B01D 33/801* (2013.01); *B01D 33/803* (2013.01); *A01G 25/00* (2013.01)

(58) Field of Classification Search

None

See application file for complete search history.

(56) References Cited

U.S. PATENT DOCUMENTS

| | | | | |
|---|---|---|---|---|
| 3,298,388 A * | 1/1967 | Purtell | .................. | A01G 25/00 239/734 |
| 2003/0010705 A1* | 1/2003 | Lenhart | .................. | B01D 33/50 210/402 |

* cited by examiner

*Primary Examiner* — Richard C Gurtowski

(57) ABSTRACT

A rotating irrigation screen apparatus includes a frame, a panel coupleable to the frame, a drum, and a belt tensioner. An upper portion of the frame may have a mounting bracket that receives a motor/gear box. The drum may include one or more screen panels that may be removably attachable. The belt tensioner may include a first bolt that receives a first bracket with a belt guide roller. The belt tensioner may be configured to interact with the motor, the belt, and the drum. The belt tensioner may increase or decrease the tension of the belt that wraps around the drum.

19 Claims, 12 Drawing Sheets

ROTATING IRRIGATION SCREEN APPARATUS

CROSS-REFERENCE TO RELATED APPLICATIONS

This application is a continuation of U.S. Non-Provisional patent application Ser. No. 18/209,637 filed on Jun. 14, 2023, which is incorporated herein by reference.

TECHNICAL FIELD

The present disclosure relates to an irrigation screen. More particularly, the present disclosure relates to a rotating irrigation screen that is easy to maintain and use and is self-cleaning.

BACKGROUND

Irrigation has been an important part of the world's history and has contributed to the survival of many nations. However, the manner in which irrigation was performed has evolved over the years. For example, the Egyptians and Chinese utilized dams, ditches, and water storage to flood irrigate crops, which is still used in some areas today. Contemporary irrigation systems often rely on wells, tanks, pumps, sprinkler pipes, and electricity to function properly. Some vast improvements to irrigation systems includes handlines, wheel lines, and center pivots. These systems often rely on pumps that are placed in ponds, canals, etc. Due to water being pumped from non-filtered water sources, screens are often used to filter out debris that could potentially clog or damage a modern irrigation system. Specifically, without first filtering the water, problems arise such as plugged pump impellers, plugged sprinkler nozzles, and increased wear and tear on irrigation equipment, which leads to the inefficient application of irrigation water. Accordingly, screens are a necessary component to a successful irrigation system.

While these screens are essential for proper functioning of irrigation systems, many screens are incorrectly sized and protrude into the canal at distances that extend beyond regulated lengths established by canal companies. Furthermore, many of these screens are not efficient, they are not self-cleaning, nor are they easily maintained. As such, damage occurs to irrigation systems that may cost a user thousands of dollars to repair. In addition, if irrigation systems are damaged due to faulty screens, crops may suffer and not produce, thereby leading to reduced income.

Accordingly, there is a need for a screen that is efficient, self-cleaning, easily maintained, user friendly, and easily serviced. The present invention seeks to solve these and other problems.

SUMMARY OF EXAMPLE EMBODIMENTS

In one embodiment, a rotating irrigation screen apparatus comprises a frame, a panel coupleable to the frame, and a removably attachable stand. An upper portion of the frame may comprise a first lifting member and a second lifting member, both of which may be used to lift and maneuver the screen apparatus. Further, the upper portion of the frame may include a mounting bracket that receives a motor/gear box. The mounting bracket may comprise a first side with a first side aperture and a second side with a second side aperture.

The removably attachable stand may be used during manufacturing and transportation, then removed prior to the screen being placed into channels of a concrete sump or a specially designed adapter. The removably attachable may be configured to receive a bottom portion of the frame and panel. The panel may be shaped to fit on the frame. The panel may be fastened to the frame via welding. The panel may comprise a drum aperture. In addition, the drum aperture may be circumscribed by a band that protrudes from both sides of the panel and is perpendicular thereto.

A second frame is positioned in and coupled to the band. The second frame may comprise a first support, a second support, and a third support that each couple to the band and may be spaced apart an equal distance. The first, second, and third supports may be coupled to the band. At a center of the drum aperture, ends opposite to those that coupled to the band, the first, second, and third supports may couple to a first end of a bearing tube. The bearing tube may comprise one or more bearings, or be configured to receive one or more bearings. Opposite the first end of the bearing tube at a second end, the second frame may further comprise a fourth support, a fifth support, and a sixth support that may couple to the second end of the bearing tube, and the fourth, fifth, and sixth supports may couple to the band.

Further, the screen apparatus comprises a drum that has a first drum member coupled to a second drum member by a first member arm, a second member arm, a third member arm, and a fourth member arm, each of the arms may be spaced apart an equal distance. Further, the first drum member may comprise a plus-shaped frame. Protruding from the center of the plus-shaped frame may be a rod. The rod may extend toward the second drum member. The rod may be smaller in diameter than the bearing tube so as to be placed and secured therein. Once the rod is positioned in the opening, the rod may rotate within the bearing tube, thereby rotating the drum. In addition, the second drum member may comprise a ridge that is positioned around the circumference of the second drum. The ridge creates a track where a belt that is coupled to the motor may be placed so as to rotate the drum. The drum may receive one or more screen panels, which may be coupled to the first drum member and second drum member via rivets. The drum is driven by the motor/gear reduction gearbox via the belt.

A belt tensioner may be configured to interact with the motor and the belt. The belt tensioner may comprise a first bracket having a first aperture on a first portion and a first fastener coupled to a second portion. The first bracket may also comprise a first protrusion. The second portion and the first protrusion may be positioned against a lower surface of the mounting bracket. The first fastener on the first bracket may receive a first bolt therethrough. The first bolt may be positioned through the first and second side apertures of the mounting bracket, and thus, between the first and second sides of the mounting bracket. The first bracket may be adjustably coupleable on the first bolt and positioned between the first and second sides of the mounting bracket. Second fasteners may be coupled onto the first bolt so as to secure the first bolt and belt tensioner in place. A belt guide roller may be coupled to the first bracket via a second bolt that is positioned through the first aperture of the first bracket. As such, once the belt guide roller is coupled to the first bracket, a user may adjust it along the first bolt so as to change the pressure on the belt. For example, as the first bracket moves toward the first side of the mounting bracket, less pressure is placed on the belt, decreasing tension. As the first bracket moves toward the second side, more pressure is placed on the belt, increasing tension.

DETAILED DESCRIPTION OF EXAMPLE EMBODIMENTS

Figure 1:
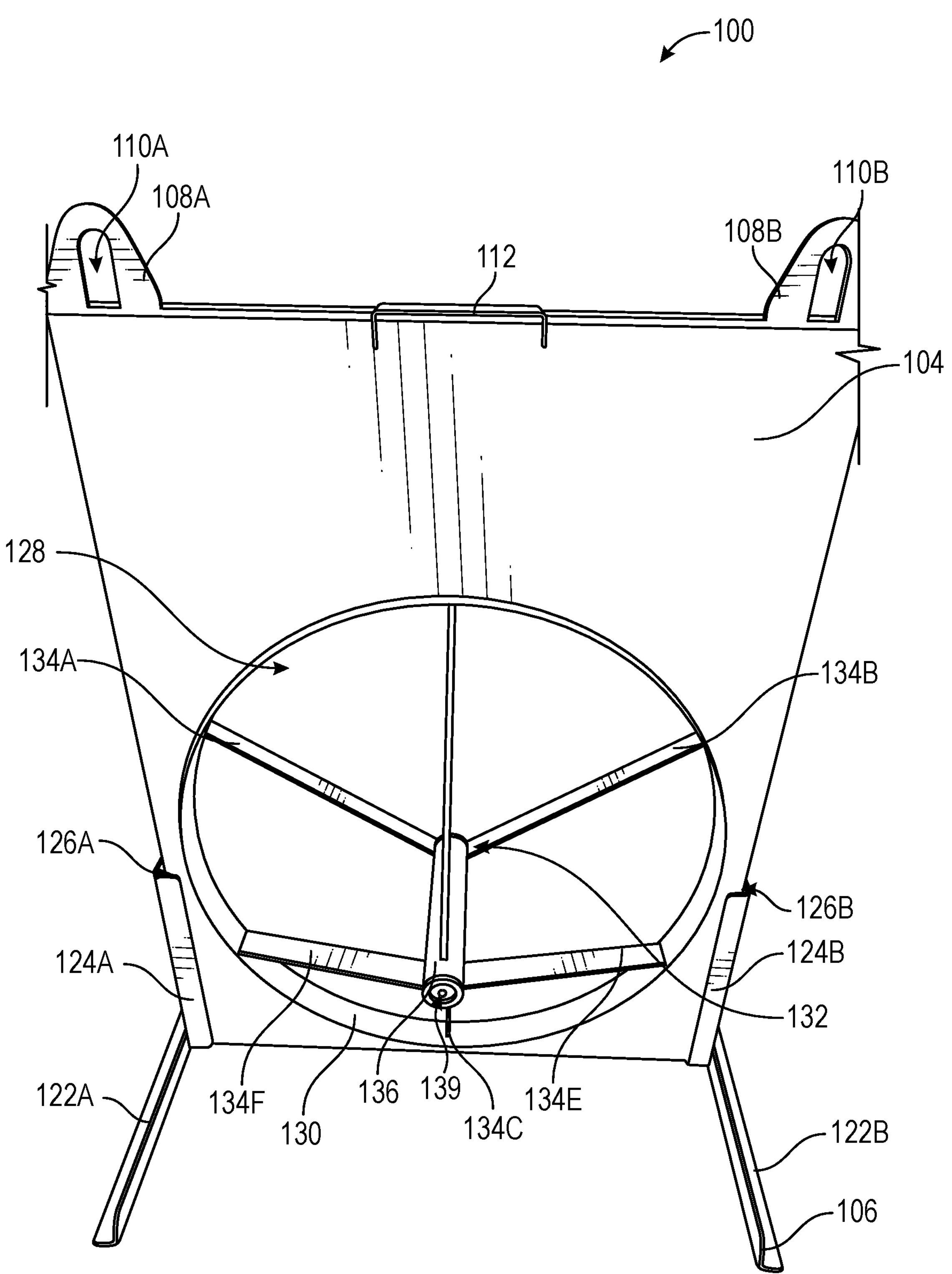
FIG. 1 illustrates a front perspective view of a rotating irrigation screen apparatus.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a screen that is efficient, self-cleaning, easily maintained, user friendly, and easily serviced. The present invention seeks to solve these and other problems.

Irrigation systems often rely on wells, tanks, pumps, sprinkler pipes, and electricity to function properly. Some vast improvements to irrigation systems include handlines, wheel lines, and center pivots. These systems often rely on pumps that are placed in ponds, canals, etc. Due to water being pump from non-filtered water sources, screens are often used to filter out debris that could potentially clog or damage a modern irrigation system. Specifically, without first filtering the water, problems arise such as plugged pump impellers, plugged sprinkler nozzles, and increased wear and tear on irrigation equipment, which leads to the inefficient application of irrigation water that may lead to damaged crops. There are many shortcomings with screens on the market, such as being incorrectly sized, not efficient, not self-cleaning, difficult to use, and difficult to maintain. Because of these shortcomings, many irrigation systems are damaged leading to increased costs, damaged crops, and frustration for a user.

A rotating irrigation screen apparatus described herein is self-cleaning, easily maintained and is user friendly, leading to efficient water filtering. The rotating screen apparatus comprises a frame, a panel, a motor, a drum with one or more screen, and a belt tensioner. The frame is configured to slide into channels on a concrete sump or other specially designed adapter. Water passes into the sump from an open water source such as a canal, pond, or river. It will be appreciated that the rotating irrigation screen apparatus may rotate both clockwise and counter-clockwise so as to adjust to the waterflow direction; a belt on the rotating screen apparatus may be loosened, tightened, or removed with a single wrench; the drum can be removed without any tools after the belt is removed; bearings used in the rotation of the drum may be easily removed and replaced with a hammer and punch; minimal fasteners (e.g., bolts) are used, with none being positioned below the water line to minimize seized bolts due to rust; and the belt tensioner and its components may be manufactured out of stainless steel to assure free movement without being hindered by rust.

Figure 2:
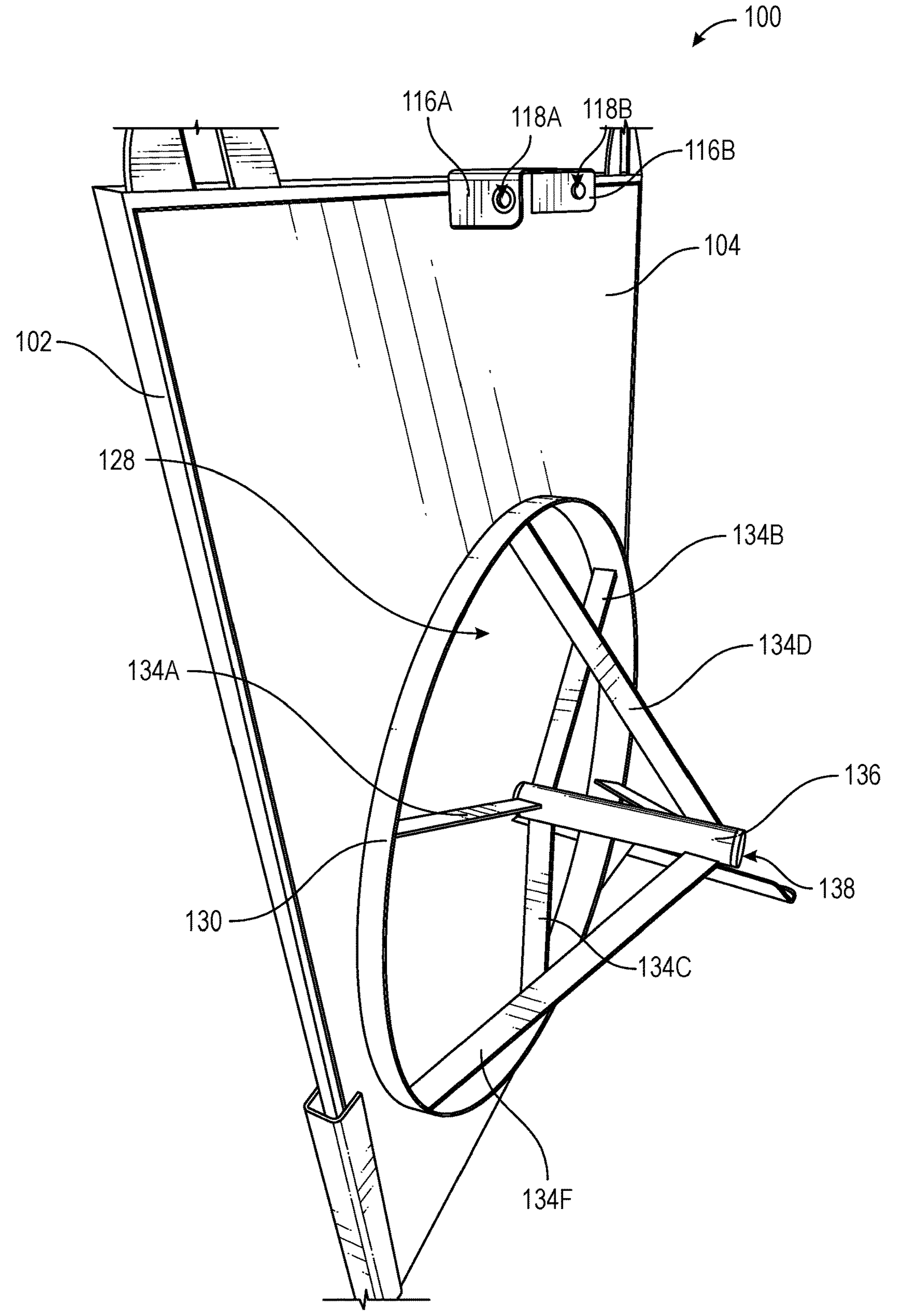
FIG. 2 illustrates a side perspective view of a rotating irrigation screen apparatus.
Figure 3:
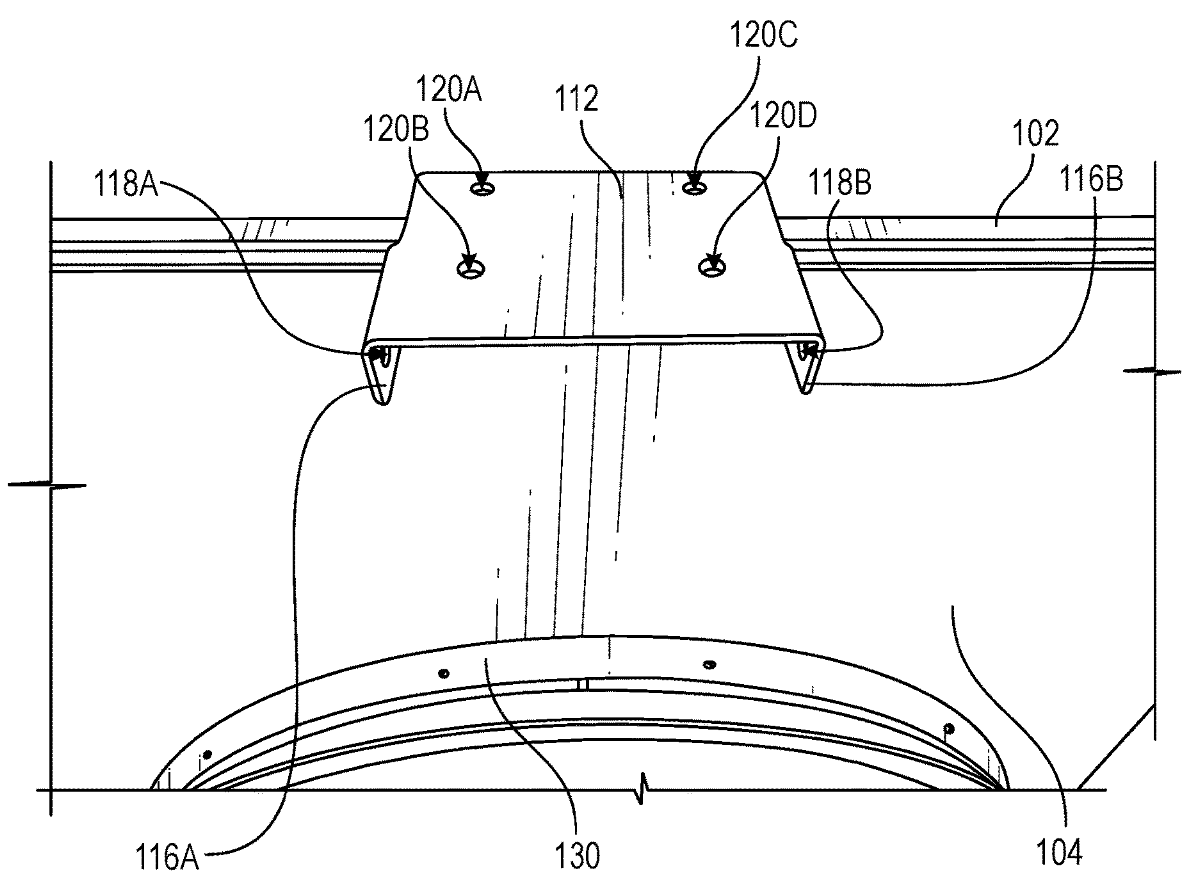
FIG. 3 illustrates a top, front perspective view of a mounting bracket of a rotating irrigation screen apparatus.
Figure 4:
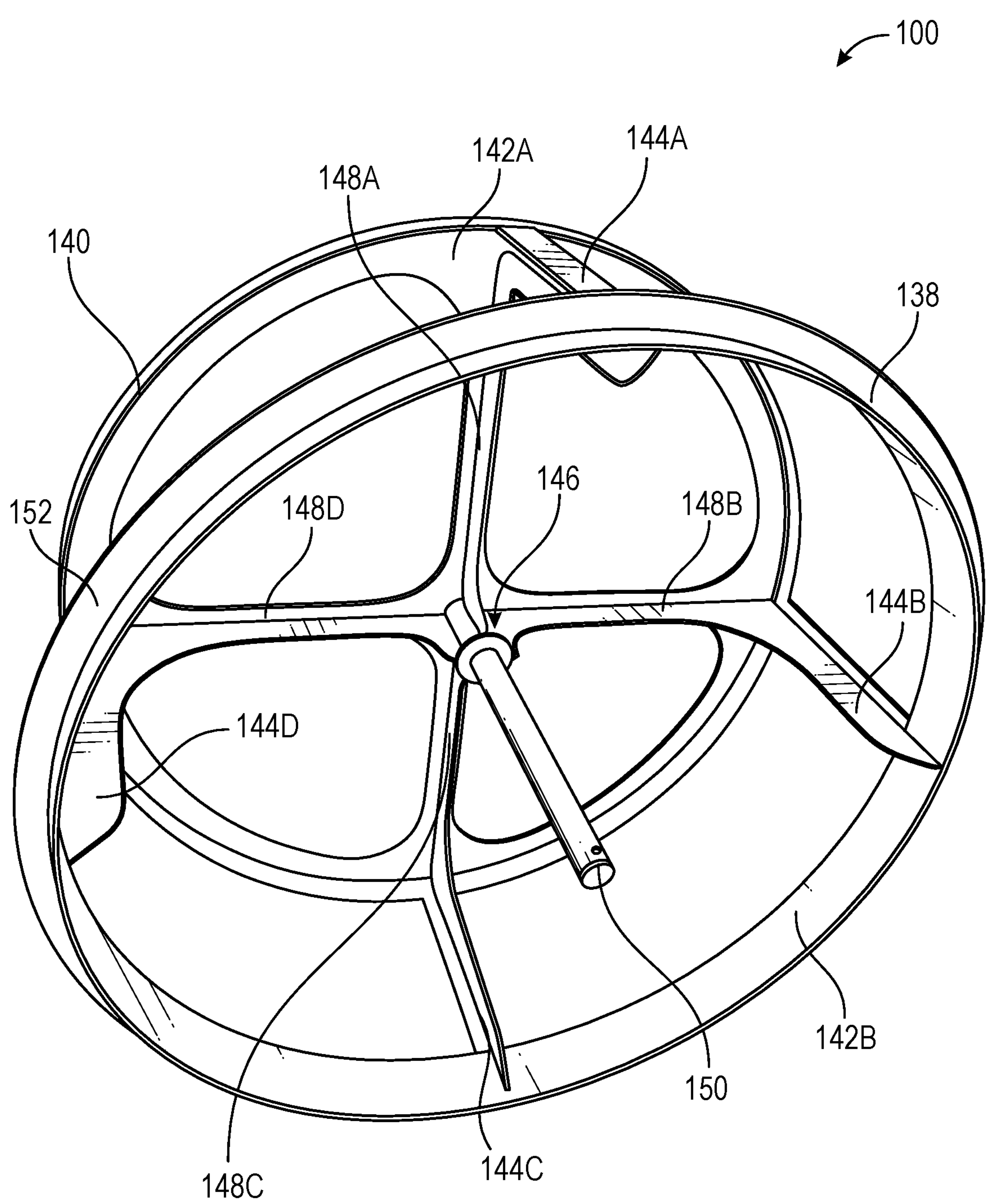
FIG. 4 illustrates a rear perspective view of a drum of a rotating irrigation screen apparatus.

As shown in FIGS. 1-3, in one embodiment, a rotating irrigation screen apparatus 100 (hereinafter referred to as the "apparatus") comprises a frame 102, a panel 104 coupleable to the frame 102, and a removably attachable stand 106. The frame 102 may be rectangular-shaped or any other shape. The frame 102 may comprise a metal material, such as stainless steel. In other embodiments, the frame 102 may be manufactured out of aluminum or any other type of material. The frame 102 may comprise square tubing. However, in some embodiments, the frame may include a different shape of tubing such as round tubing that may, for example, be bent from a single piece or welded.

Figure 5:
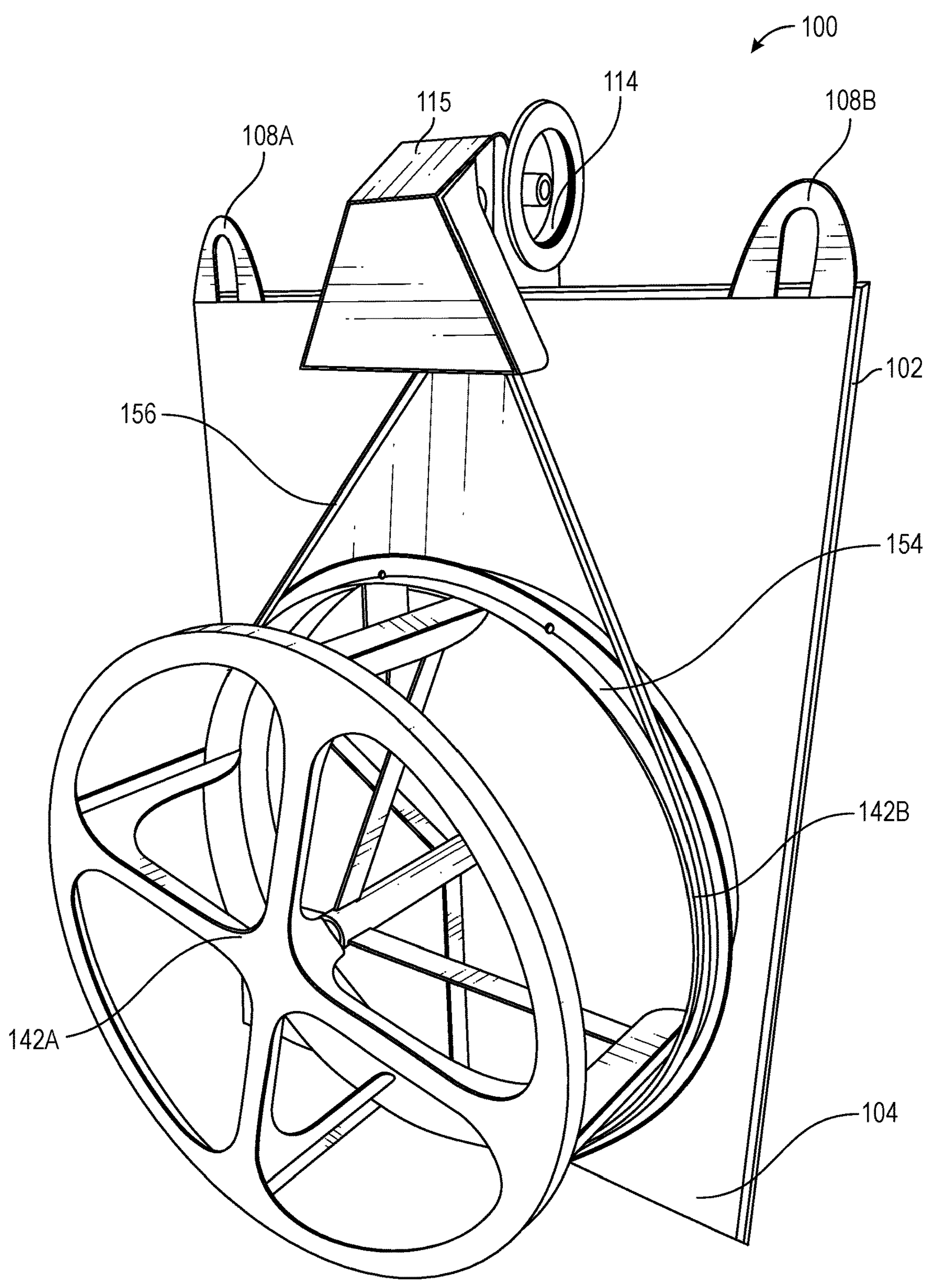
FIG. 5 illustrates a perspective view of a rotating irrigation screen apparatus.
Figure 6:
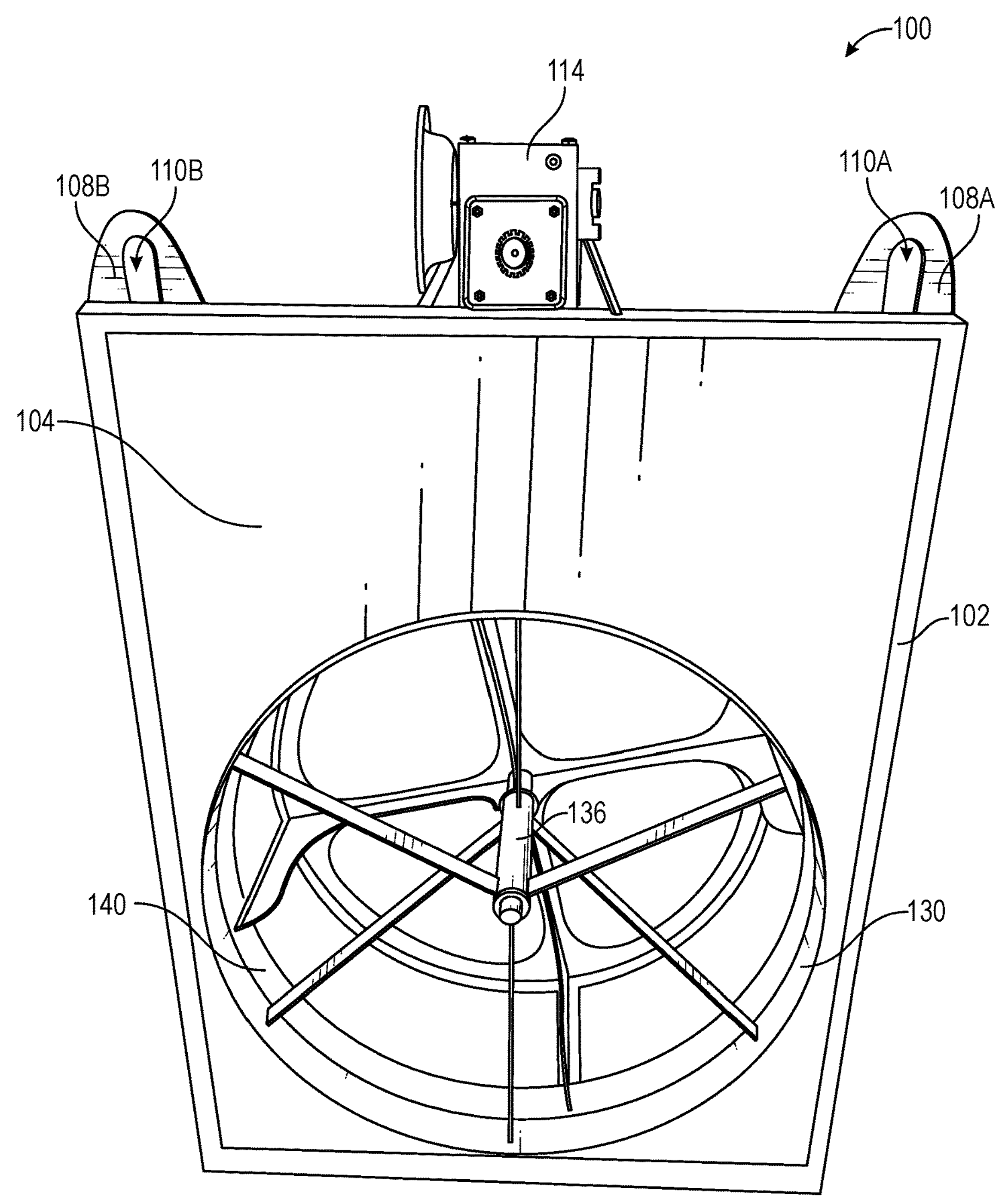
FIG. 6 illustrates a rear perspective view of a rotating irrigation screen apparatus.
Figure 7:
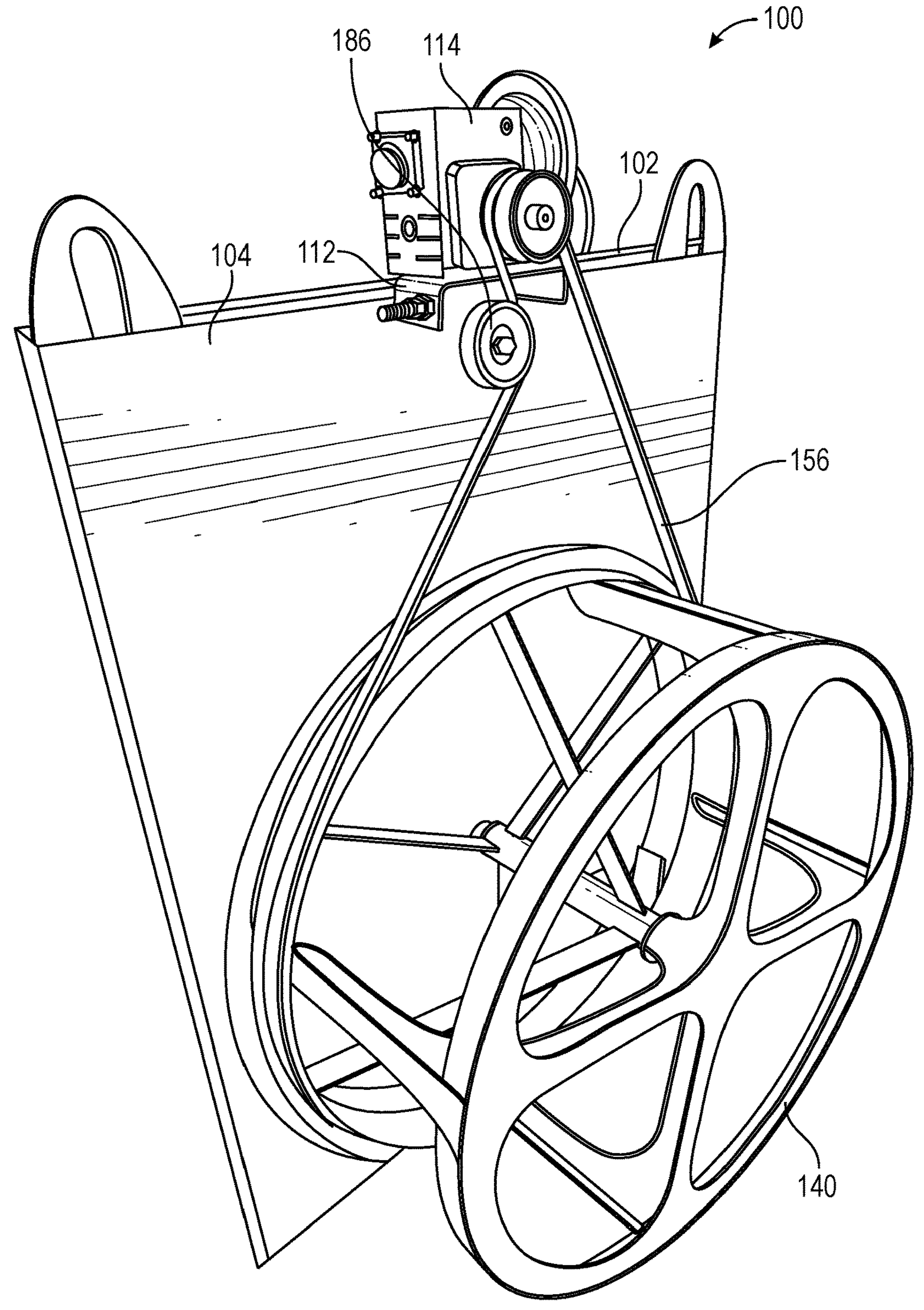
FIG. 7 illustrates a front, side perspective view of a rotating irrigation screen apparatus.

An upper portion of the frame 102 may comprise a first lifting member 108A with a first aperture 110A and a second lifting member 108B with a second aperture 110B, both of which may be used to lift and maneuver the screen 102. Further, the upper portion of the frame 102 may include a mounting bracket 112 that receives a motor/gear box 114 (FIG. 5), which is covered by a belt cover 115 (FIG. 5). The motor 114 may be an electric or fuel powered motor. In some embodiments, the apparatus 100 may be driven via water pressure. Referring to FIGS. 2-3, the mounting bracket 112 may comprise a first side 116A with a first side aperture 118A and a second side 116B with a second side aperture 118B. The mounting bracket 112 may also include motor apertures 120A, 120B, 120C, 120D that receive fasteners (e.g., bolts and nuts) so as to couple the motor 114 to the mounting bracket 112.

Referring back to FIGS. 1-2, the removably attachable stand 106 may be used during manufacturing and transportation, then removed prior to the screen 100 being placed into channels of a concrete sump or a specially designed adapter. The removably attachable stand 106 may comprise a first leg 122A and a second leg 122B. A first vertical arm 124A with a first channel 126A may be coupled to the first leg 122A, and a second vertical arm 124B with a second channel 126B may be coupled to the second leg 122B. The first and second channels 126A, 126B may be configured to receive a bottom portion of the frame 102 and panel 104.

The panel 104 may be shaped to fit on the frame 102. That is, the panel 104 may be rectangular-shaped. The panel 104 may be manufactured out of a sheet of metal, such as steel or aluminum. The panel 104 may be fastened to the frame 102 via welding. Other fastening mechanisms may include bolts and nuts, rivets, etc. In some embodiments, the panel 104 and the frame 102 may be manufactured from a single piece of material, creating a single unit. The panel 104 may comprise a drum aperture 128. In addition, the drum aperture 128 may be circumscribed by a band 130 that protrudes from both sides of the panel 104 and is perpendicular thereto.

A second frame 132 is positioned in and coupled to the band 130. The second frame 132 may comprise a first support 134A, a second support 134B, and a third support 134C that each couple to the band 130 and may be spaced apart an equal distance. While three supports are shown, it will be understood that more or less than three supports may be used. The first, second, and third supports 134A, 134B, 134C may be coupled to the band 130 via welding or other fastening mechanisms, such as bolts and nuts. At a center of the drum aperture 128, ends opposite to those that couple to the band 130, the first, second, and third supports 134A, 134B, 134C may couple via welds, or other fastening mechanisms, to a first end of a bearing tube 136. The bearing tube 136 may comprise one or more bearings, or be configured to receive one or more bearings. The bearing tube 136 may comprise an opening 138. The bearing tube 136 may comprise a drain aperture 139 (FIG. 1) that allows water to drain from the bearing tube 136 in the Fall when the water source is emptied or irrigation for the season is completed. Opposite the first end of the bearing tube 136 at a second end, the second frame may further comprise a fourth support 134D, a fifth support 134E, and a sixth support 134F that may couple thereto via welds and the fourth, fifth, and sixth supports 134D, 134E, 134F may each be coupled to the band 130. More specifically, the fourth support 134D may be interposed between the first and second supports 134A, 134B, the fifth support 134E may be interposed between the second and third supports 134B, 134C, and the sixth support 134F may be interposed between the third and first supports 134C, 134A.

As shown in FIG. 4-7, a drum 140 comprises a first drum member 142A (e.g., a circular member) coupled to a second drum member 142B by a first member arm 144A, a second member arm 144B, a third member arm 144C, and a fourth member arm 144D, each of the arms 144A-144D may be spaced apart an equal distance. The drum 140 is a motion component and mounts into the bearing tube 136 of the panel 104. The drum 140 may be fabricated/powder coated steel frame. As the drum 140 rotates the debris and trash is held outside of the drum as the clean water passes through.

Further, the first drum member 142A may comprise a plus-shaped frame 146 including a first member support 148A, a second member support 148B, a third member support 148C, and a fourth member support 148D. Protruding from the center of the plus-shaped frame 146 may be a rod 150. The rod 150 may extend toward the second drum member 142B. The rod 150 may be smaller in diameter than the bearing tube 136 so as to be placed in the opening 138 and secured therein. Once the rod 150 is positioned in the opening 138, the rod 150 may rotate within the bearing tube 136, thereby rotating the drum 140. In addition, the second drum member 142B may comprise a ridge 152 that is positioned around the circumference of the second drum member 142B. The ridge 152 creates a track 154 where a belt 156 (e.g., a v-belt) that is coupled to the motor 114 may be placed so as to rotate the drum 140.

Figure 8:
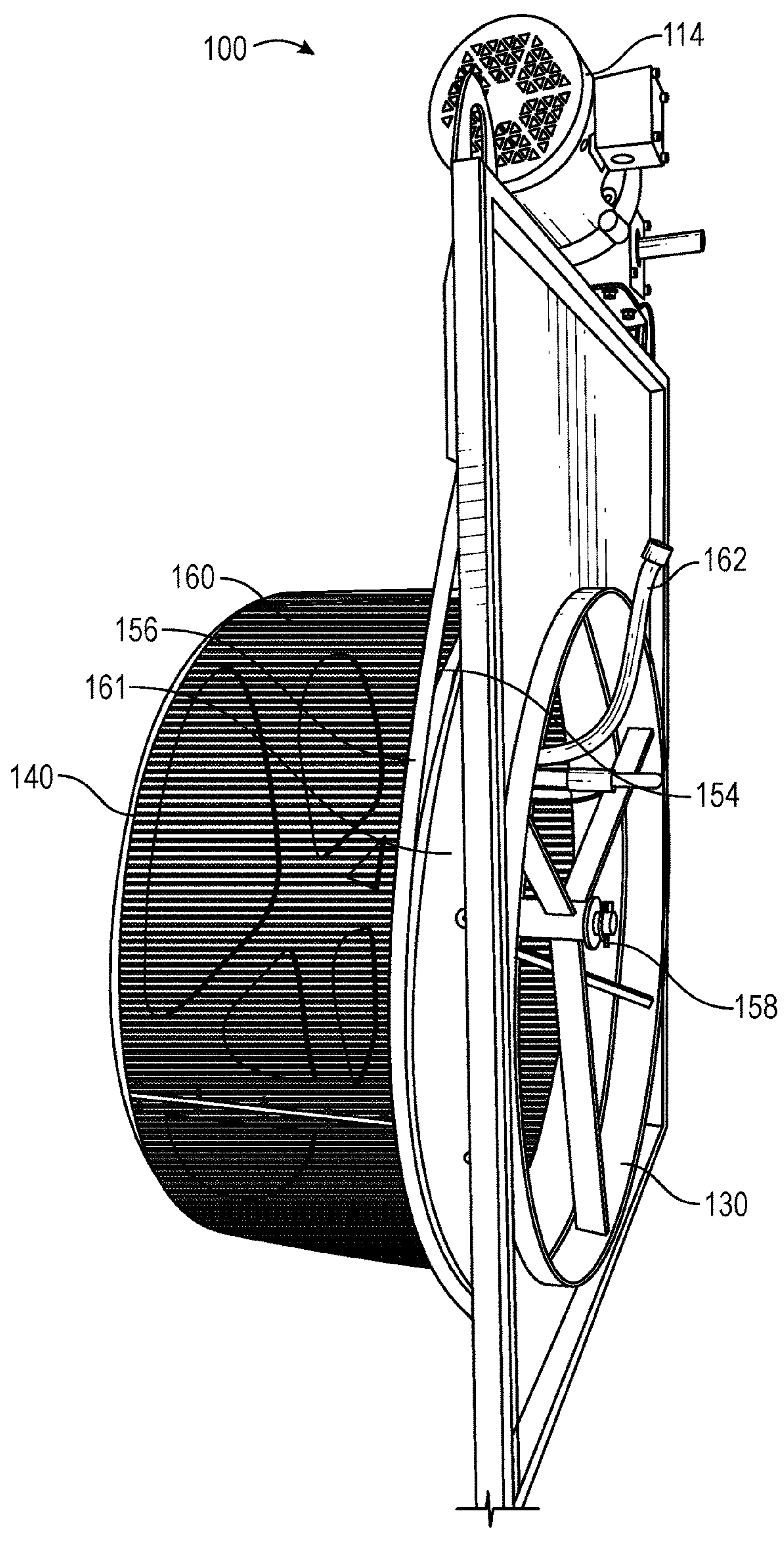
FIG. 8 illustrates a rear, side perspective view of a rotating irrigation screen apparatus.
Figure 9:
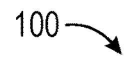
FIG. 9 illustrates a rear perspective view of a rotating irrigation screen apparatus.
Figure 9:
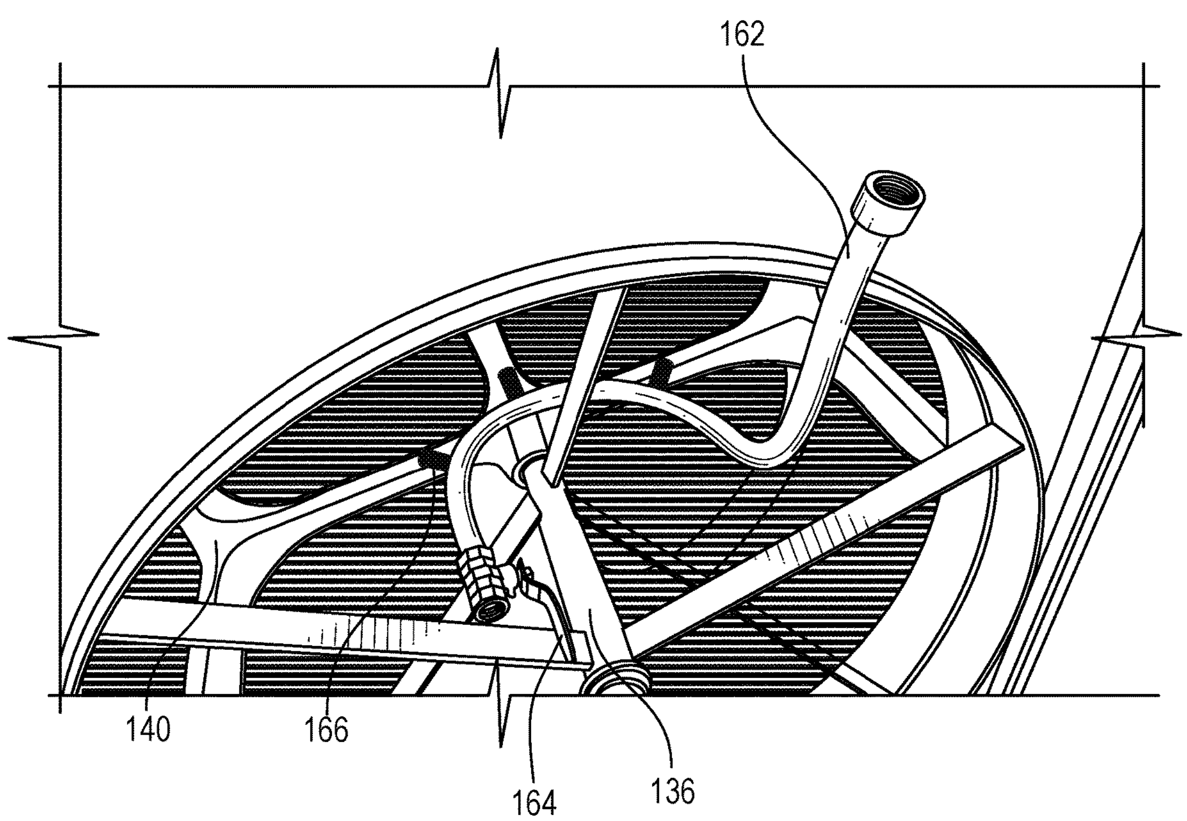

As shown in FIG. 8-9, the drum 140 may be secured to the bearing tube 136 and the apparatus 100 by a drum fastener 158. The drum fastener 158 may include a lynch pin, or any other fastening mechanism, such as a bolt and nut. The drum 140 may rotate clockwise or counter-clockwise. The drum 140 may receive one or more screen panels 160 (e.g., stainless steel perforated sheet), which may be coupled to the first drum member 142A and second drum member 142B via rivets or other types of fasteners. In some embodiments, the one or more screen panels 160 comprise five panels. It will be appreciated that multiple panels allow a user to replace a single damaged screen panel instead of replacing a single panel that wraps around the drum 140. A seal strip 161 (e.g., rubber) that keeps debris out of the apparatus 100 may couple to the band 130 via rivets or other fastening mechanisms and extend to the ridge 152 on an opposite side of the ridge from where the track 154 is located. It will be further appreciated that as the drum 140 rotates, (e.g., with the top of the drum rotating the same direction as the flow of water) the debris and trash is held outside of the drum as the clean water passes through. Any debris that sticks to the drum 140 is lifted up and over as a spray bar 162 sprays the one or more screen panels 160 and washes the debris off and downstream. The spray bar 162 may comprise a lever 164 to control water flow and one or more nozzles 166 that spray the one or more screen panels 160. In some embodiments, the spray bar 162 may be manufactured from steel, plastics, aluminum, etc. The spray bar 162 may be welded to the apparatus 100 and may have components welded thereto. In other embodiments, the spray bar 162 may be coupled to the apparatus 100 via bolts and nuts, or other fastening mechanisms, and may comprise components that are fastened to the spray bar via threaded fastening mechanisms. The drum 104 is driven by the motor/gear reduction gearbox 114 via the belt 156.

Figure 10:
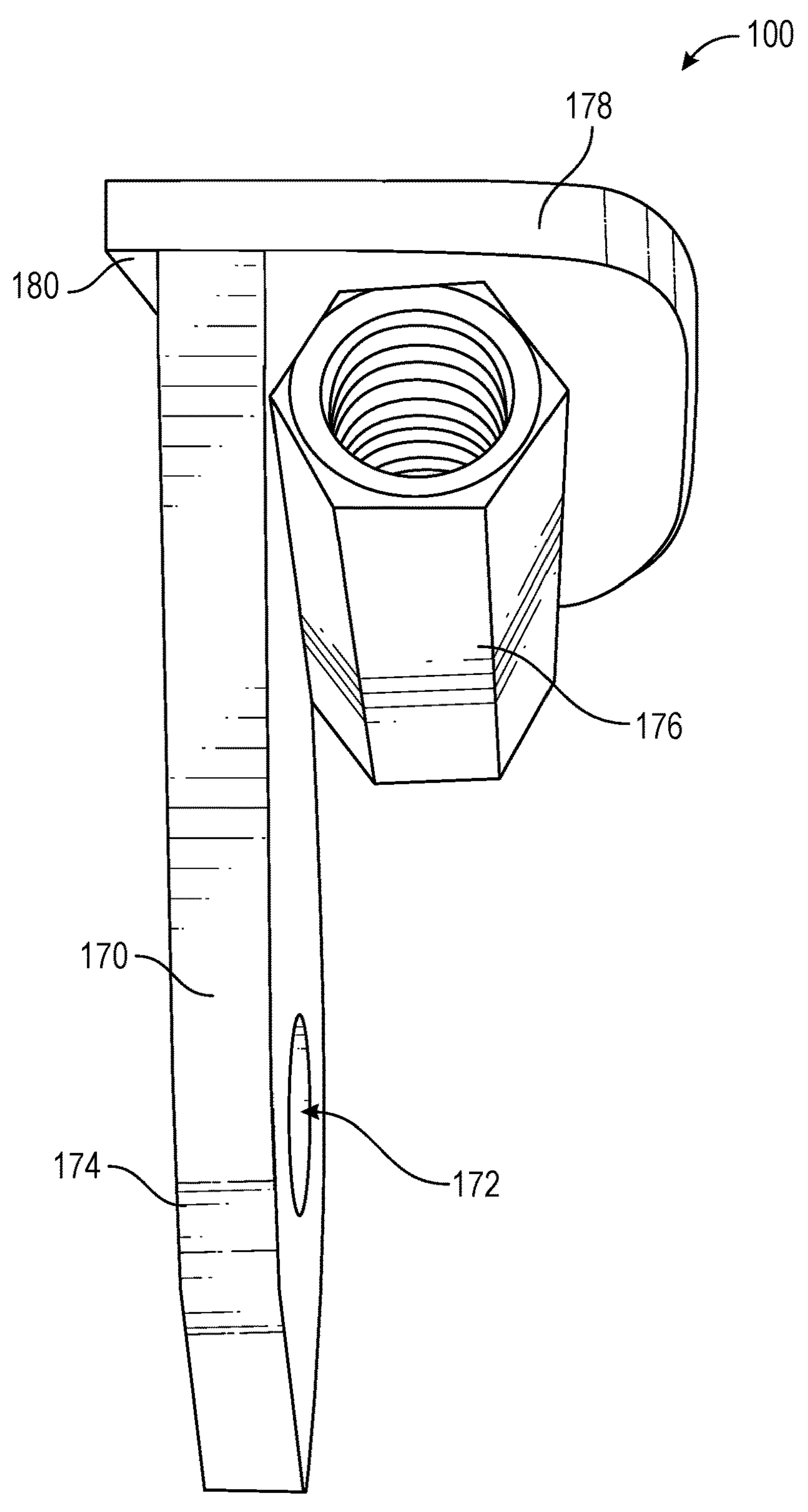
FIG. 10 illustrates a side perspective view of a first bracket of a rotating irrigation screen apparatus.
Figure 11:
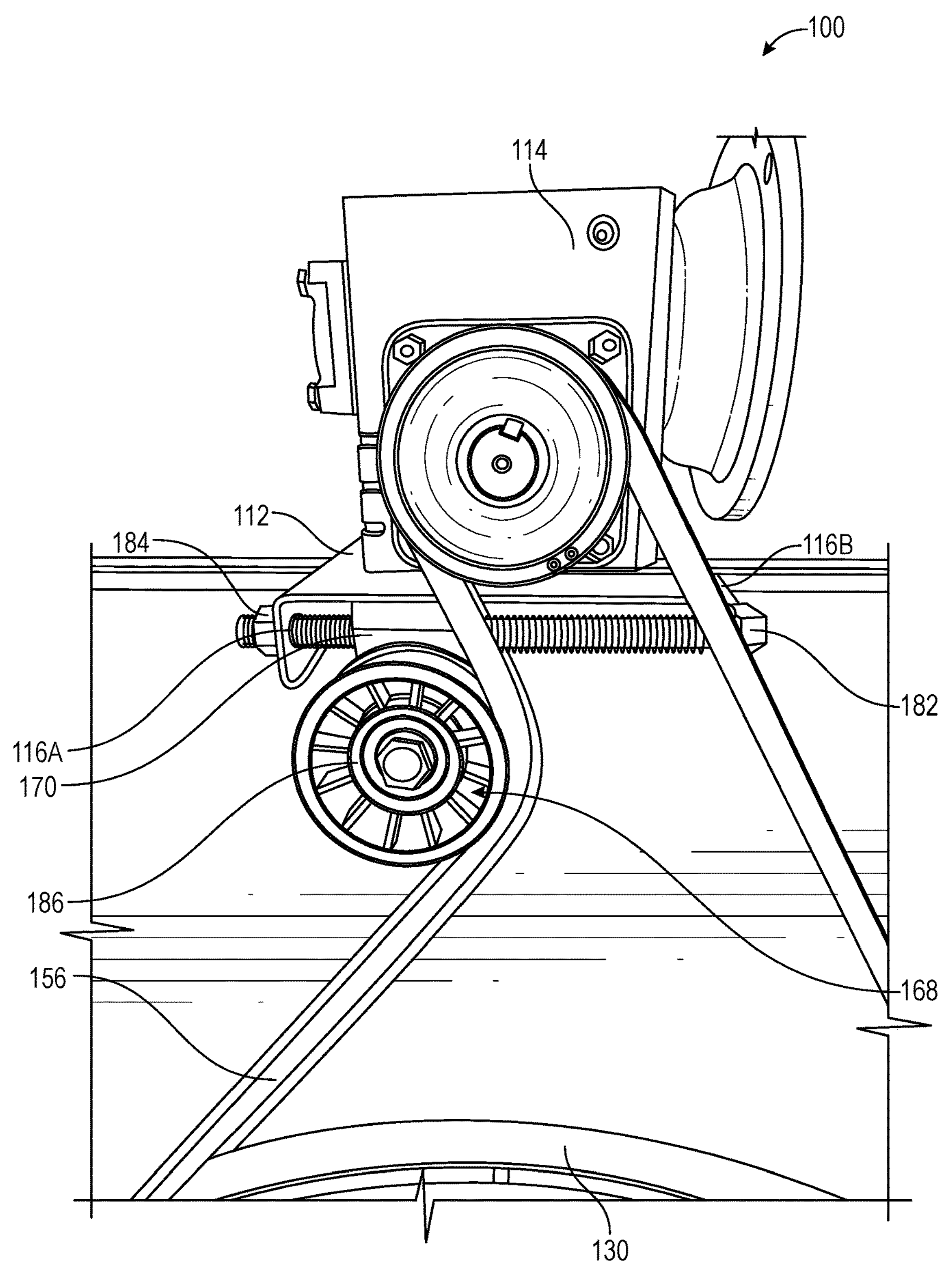
FIG. 11 illustrates a front perspective view of a belt tensioner of a rotating irrigation screen apparatus.
Figure 12:
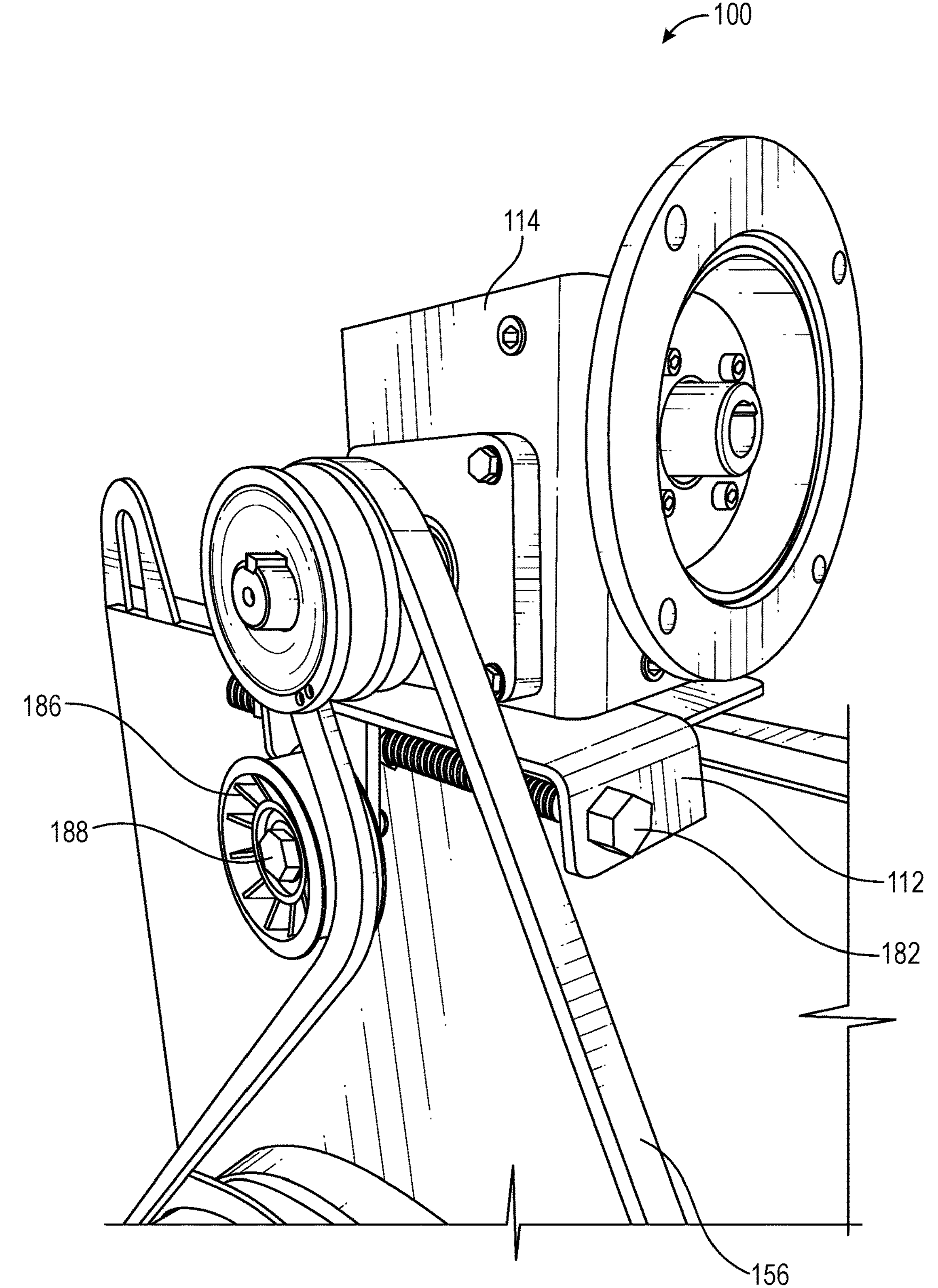
FIG. 12 illustrates a side perspective view of a belt tensioner of a rotating irrigation screen apparatus.

As shown in FIGS. 10-12, a belt tensioner 168 may be configured to interact with the motor 114 and the belt 156. The belt tensioner 168 may comprise a first bracket 170 having a first aperture 172 on a first portion 174 and a first fastener 176 (e.g., a threaded nut) coupled to a second portion 178. The first bracket 170 may be an L-shaped bracket. The first bracket 170 may also comprise a first protrusion 180. The second portion 178 and the first protrusion 180 may be positioned against a lower surface of the mounting bracket 112. The first fastener 176 on the first bracket 182 may receive a first bolt 184 therethrough. The first bolt 184 may be positioned through the first and second side apertures 118A, 118B, and thus, between the first and second sides 116A, 116B of the mounting bracket 112. The first bracket 170 may be adjustably coupleable to the first bolt 184 and positioned between the first and second sides 116A, 116B. Second fasteners 186 may be coupled onto the first bolt 184 so as to secure the first bolt 184 and belt tensioner 168 in place. A belt guide roller 188 may be may be coupled to the first bracket 170 via a second bolt 190 that is positioned through the first aperture 172. As such, once the belt guide roller 188 is coupled to the first bracket 170, a user may adjust it along the first bolt 184 so as to change the pressure/tension on the belt 156. For example, as the first bracket 170 moves toward the first side 116A of the mounting bracket 112, less pressure is placed on the belt 156, decreasing tension. As the first bracket 170 moves toward the second side 116B, more pressure is placed on the belt 156, increasing tension. It will be appreciated that the belt tensioner 168 can provide the necessary tension to the belt 156 so as to rotate the drum 140 properly. It will be appreciated that the apparatus 100 can rotate both clockwise and counter-clockwise, depending on flow direction of water; the belt 156 can be loosened, tightened, or removed with a single wrench, the drum can be removed without any tools, once the belt 156 is removed; bearings in the bearing tube 136 can be easily removed and replaced with a hammer and punch; there are minimal bolts in the apparatus 100 and none below the water line to minimize seized bolts due to rust; and the belt tensioner 168 and first bolt 184 may be made of stainless steel to assure free movement without being hindered by rust. The apparatus 100 may comprise a durable powder coat finish.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A rotating irrigation screen apparatus comprising:
- a frame comprising a motor;
- a panel fastened to the frame, the panel comprising a drum aperture; wherein the panel is substantially the same shape and size of the frame;
- a second frame coupled to the panel;
- a bearing tube coupled to the second frame;
- a drum rotatably coupled to the bearing tube; and
- a belt tensioner.

2. The rotating irrigation screen apparatus of claim 1, further comprising a mounting bracket that couples to the frame and that receives the motor.

3. The rotating irrigation screen apparatus of claim 1, further comprising a band that circumscribes the drum aperture and protrudes from a first side and a second side of the panel.

4. The rotating irrigation screen apparatus of claim 1, further comprising a belt cover that conceals the belt tensioner.

5. The rotating irrigation screen apparatus of claim 1, wherein the bearing tube comprises one or more bearings.

6. The rotating irrigation screen apparatus of claim 1, wherein the bearing tube comprises one or more drain apertures that allow water to drain therefrom.

7. The rotating irrigation screen apparatus of claim 1, further comprising a spray bar with a lever that allows water to flow through the spray bar.

8. The rotating irrigation screen apparatus of claim 1, wherein the belt tensioner comprises a first bracket.

9. The rotating irrigation screen apparatus of claim 8, wherein the first bracket couples to a first bolt, the first bolt being coupled to a mounting bracket.

10. The rotating irrigation screen apparatus of claim 8, wherein a belt guide roller couples to the first bracket and interacts with a belt to increase or decrease tension on the belt that wraps around the drum.

11. The rotating irrigation screen apparatus of claim 1, wherein the drum is secured to the bearing tube via a drum fastener.

12. A rotating irrigation screen apparatus comprising:
- a frame comprising a mounting bracket;
- a panel fastened to the frame, the panel comprising a drum aperture and a band circumscribing the drum aperture;
- a second frame;
- a bearing tube coupled to the second frame;
- a drum comprising a rod, the rod is positionable in the bearing tube;
- one or more screen panels coupled to the drum; and
- a belt tensioner comprising a first bracket, the first bracket couples to a first bolt that interacts with the mounting bracket;
- wherein the belt tensioner moves along the first bolt to increase or decrease tension on a belt that is positioned around the drum.

13. The rotating irrigation screen apparatus of claim 12, further comprising a first lifting member and a second lifting member that allow the rotating irrigation screen apparatus to be lifted and maneuvered.

14. The rotating irrigation screen apparatus of claim 12, further comprising a belt guide roller that couples to the first bracket and interacts with the belt.

15. The rotating irrigation screen apparatus of claim 12, wherein the first drum member comprises a plus-shaped frame where the rod protrudes from.

16. The rotating irrigation screen apparatus of claim 12, wherein the second drum member comprises a ridge that runs the circumference of the second drum member.

17. The rotating irrigation screen apparatus of claim 12, wherein the second drum member comprises a track proximate a ridge that receives the belt.

18. The rotating irrigation screen apparatus of claim 12, further comprising a seal strip that couples to the band.

19. A rotating irrigation screen apparatus comprising:
- a frame comprising a mounting bracket that receives a motor;

a panel fastened to the frame, the panel comprising a drum aperture;

a second frame coupled to the panel at the drum aperture;

a bearing tube coupled to the second frame, the bearing tube comprising one or more drain apertures;

a drum comprising a first drum member coupled to a second drum member, the drum comprising a rod, the rod is positionable in the bearing tube;

one or more screen panels coupled to the drum;

a spray bar with one or more nozzles that sprays water to remove debris from the one or more screen panels; and a belt tensioner that interacts with a belt and the motor.

* * * * *